Figure 1:
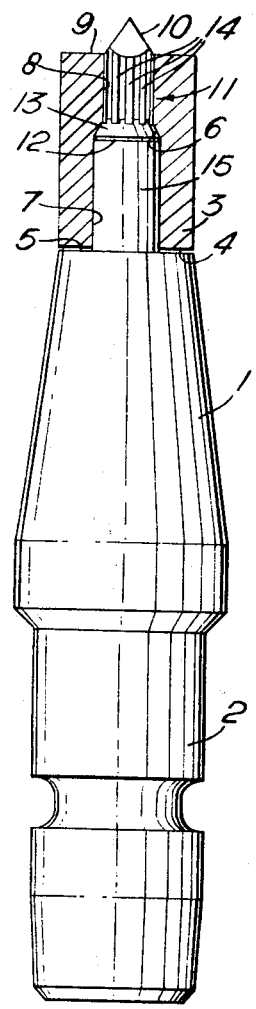

Dec. 5, 1967   J. R. HEALEY ET AL   3,356,418
COAL-CUTTER PICK WITH HARD METAL TIP AND METHOD OF MAKING
Filed Dec. 30, 1965

Inventor
John Raymond Healey
Francis Eric Hale
By
Watson, Cole, Grindle & Watson
Attorneys

United States Patent Office 3,356,418
Patented Dec. 5, 1967

3,356,418
COAL-CUTTER PICK WITH HARD METAL TIP
AND METHOD OF MAKING
John R. Healey and Francis E. Hoole, Sheffield, England,
assignors to Tungsten Carbide Developments Limited
Filed Dec. 30, 1965, Ser. No. 517,875
Claims priority, application Great Britain, Jan. 9, 1965,
1,090/65
15 Claims. (Cl. 299—91)

This invention relates to coal-cutter picks and like tools with hard metal (usually tungsten carbide) tips of plug-like type secured in a bore from which the operative end of the tip protrudes.

It is usual to secure such a tip in the bore in the pick by brazing. However, it is difficult to ensure that the brazed joint is effective over the whole area of its contact with the wall of the bore and the length of the plug fitted in the bore. This is because clearance must necessarily be provided between the plug and the bore to receive the brazing material, and it does not follow that the whole of this clearance is filled by the material when it melts on the application of brazing heat and subsequently sets. Consequently, under the heavy stresses to which the tip is subjected in use, and this applies with great particularity to coal-cutter picks of the point-attack type, any weakness in the joint sooner or later leads to failure of the joint, with likelihood of loss of the tip.

The object of the invention is to provide for securing of such a tip without the use of a brazed joint, with the tip strongly supported in the bore in which it is inserted.

According to the present invention, a method of securing a plug-like hard metal tip in a bore of a coal-cutter pick or like tool comprises the use of a tip having a shouldered enlargement at the end remote from the operative end intended to protrude from the bore, fitting the tip into a bored nose of tool steel, the nose having a bore to fit accurately the length of the tip up to the shoulder and a counterbore the end of which fits the shoulder accurately, and butt-welding the nose to a tool steel body, with pressure applied in the lengthwise direction of the tip so as to leave the shoulder of the tip held to the end of the counterbore by metallic pressure maintained on the end face of the shouldered end when the weld has been completed.

The length of the tip to the shouldered end is now held in the bore and supported by the close fit it makes with the wall of the bore, so that the metal of the nose counters thrusts received at any angle to the lengthwise direction of the tip, a thrust in that direction being directly countered by the backing pressure maintained on the end face of the shouldered end.

Preferably, the nose is substantially longer than the tip, the counterbore being correspondingly longer and filled by a tool steel block the one end of which makes the pressure contact with the end face of the shouldered end of the tip. The block may be a spigot projecting from the tool steel body; or it may be a separate block inserted in the counterbore, after insertion of the tip, and applied to the body with the nose when the nose is to be butt-welded to the body.

The block should have a sufficient excess of length to allow for flow under the butt-welding pressure, so as to ensure that when the joint has been completed the end face of the shouldered end of the tip is solidly supported by metal, which, when the above-mentioned inserted block is used, is provided by one end of the block, the other end being held firmly to the tool steel body.

Figure 2:
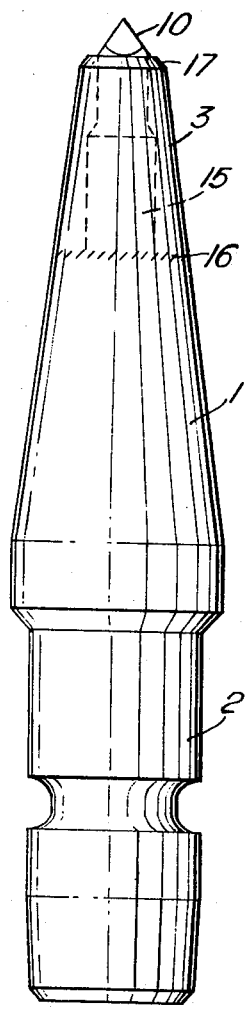

The invention will now be further described with reference to a preferred construction of point-attack coal-cutter pick, as shown in the accompanying drawings, in which FIGURE 1 is a part-sectional elevation of the parts of the pick assembled ready for butt-welding; and FIGURE 2 is an elevation of the pick after butt-welding and finish-machining.

In FIGURE 1, a tool steel pick body 1 extends from a shank 2 that is to be secured in a pick box (not shown), and, tapering towards the position to be occupied by the operative end of a tip, stops short of that position by an amount that is made up by the provision of a tool steel nose coaxially bored from its end face 4 intended to fit the end face 5 of the shortened body, the inner end 6 of this bore 7 being conical to lead to a coaxial smaller bore 8 through to the other end face 9 of the nose. The bore 7 is thus a counterbore with respect to the bore 8.

A hard metal tip 10 has a main length 11 to fill the length of the bore 8 and to protrude as a point beyond the end face 9 of the nose 3. The other end of the length enlarges into a shoulder member 12, the shoulder 13 of which fits the conical end 6 of the counterbore 7. The diameter of the shoulder member 12 preferably fits closely the diameter of the counterbore 7, but closeness of fit at this location is not so important as that between the main length 11 of the tip 10 and the smaller bore 8. It is indeed advantageous to have a force fit in the latter location, as is assumed by providing slightly protruding splines 14 along the length 11 of the tip.

The shouldered member 12 extends only briefly along the counterbore 7, the remaining length of which is filled by a cylindrical block 15, which also may be of tool steel, of a length to protrude slightly from the end face 4 of the nose 3 that is to fit the end face 5 of the body 1.

The tip 10 and the block 15 being assembled in the nose 3, as shown in FIGURE 1, the nose is applied to the body 1 and butt-welded under the application of lengthwise pressure to effect an annular weld (indicated at 16 in FIGURE 2) between the faces 4, 5 respectively of the nose and the body. While the weld is being made, the lengthwise pressure causes the block 15 to press the shoulder 13 of the tip 10 to the conical end 6 of the counterbore 7, and this pressure is maintained as the weld cools, and indeed tends to be increased by contraction of the welded metal. The nose 3 is then finish-machined to the same taper as the body 1 and bevelled at 17 towards the point of the tip 10.

The curtailed body could be formed with a spigot to enter the counterbore and assist in aligning the nose with the body, the block then being shortened by the length of the spigot. Alternatively, the spigot could replace the block altogether.

Although circular sections for the smaller bore and the counterbore, and corresponding sections for the tip, lead to ease of manufacture of both the nose and the tip, other cross-sections, e.g., square, are not precluded, provided there is the necessary close fit of the tip in the small bore.

It is to be understood that the invention is not limited to its use in point-attack picks, such use as above described with reference to such a pick being merely by way of example, but can be applied to picks in general provided with hard metal tips.

What we claim is:

1. A method of securing a plug-like hard metal tip in a bore in a coal-cutter pick comprises using a tip having a shouldered enlargement at the end remote from the operative end, fitting the tip into a bored nose of tool steel having a bore to fit accurately the length of the tip up to the shoulder and a counterbore the end of which fits the shoulder accurately, and butt-welding the nose to a tool steel body, with pressure applied in the lengthwise direction of the tip so as to leave the shoulder of the tip held to the end of the counterbore by metallic pressure maintained on the end face of the shouldered end when the weld has been completed.

2. A method of securing a plug-like hard metal tip in a bore in a coal-cutter pick comprises using a tip having a shouldered enlargement at the end remote from the operative end, fitting the tip into a bored nose of tool steel having a bore to fit accurately the length of the tip up to the shoulder and a counterbore the end of which fits the shoulder accurately, the nose being longer than the tip and the counterbore being correspondingly longer than the enlargement, filling the remainder of the counterbore by a tool steel block, and butt-welding the nose to a tool steel body, with pressure applied in the lengthwise direction of the tip so as to leave the shoulder of the tip held to the end of the counterbore by metallic pressure maintained on the end face of the shouldered end by the tool steel block when the weld has been completed.

3. A method of securing a plug-like hard metal tip in a bore in a coal-cutter pick comprises using a tip having a shouldered enlargement at the end remote from the operative end, fitting the tip into a bored nose of tool steel having a bore to fit accurately the length of the tip up to the shoulder and a counterbore the end of which fits the shoulder accurately, the nose being longer than the tip and the counterbore being correspondingly longer than the enlargement, fitting the nose on a spigot projecting from a tool steel body, the spigot filling the remainder of the counterbore, and butt-welding the nose to the tool steel body, with pressure applied in the lengthwise direction of the tip so as to leave the shoulder of the tip held to the end of the counterbore by metallic pressure maintained on the end face of the shouldered end by the spigot when the weld has been completed.

4. A method of securing a plug-like hard metal tip in a bore in a coal-cutter pick comprises using a tip having a shouldered enlargement at the end remote from the operative end, fitting the tip into a bored nose of tool steel having a bore to fit accurately the length of the tip up to the shoulder and a counterbore the end of which fits the shoulder accurately, the nose being longer than the tip and the counterbore being correspondingly longer than the enlargement, partially filling the remainder of the counterbore by a tool steel block, fitting the nose on a spigot projecting from a tool steel body, the spigot filling the rest of the remainder of the counterbore, and butt-welding the nose to the tool steel body, with pressure applied in the lengthwise direction of the tip so as to leave the shoulder of the tip held to the end of the counterbore by metallic pressure maintained on the end face of the shouldered end by the tool steel block when the weld has been completed.

5. A method as in claim 1, wherein the length of the tip up to the shoulder affords a force fit in the bore of the nose.

6. A method as in claim 1, wherein the length of the tip up to the shoulder is provided with slightly protruding splines affording a force fit in the bore of the nose.

7. A coal-cutter pick comprising a hard metal tip having a shouldered enlargement at the end, remote from the operative end, a tool steel nose having a bore fitting accurately the length of the tip up to the shoulder and a counterbore the end of which fits the shoulder accurately, and a tool steel body to which the nose is butt-welded with pressure applied in the lengthwise direction of the tip for the shoulder of the tip to be held to the end of the counterbore by metallic pressure maintained on the end face of the shouldered end when the weld has been completed.

8. A coal-cutter pick comprising a hard metal tip having a shouldered enlargement at the end, remote from the operative end, a tool steel nose having a bore fitting accurately the length of the tip up to the shoulder and a counterbore the end of which fits the shoulder accurately, the nose being longer than the tip and the counterbore being correspondingly longer than the enlargement, a tool steel block filling the remainder of the counterbore, and a tool steel body to which the nose it butt-welded with pressure applied in the lengthwise direction of the tip for the shoulder of the tip to be held to the end of the counterbore by metallic pressure maintained on the end face of the shouldered end, by the tool steel block when the weld has been completed.

9. A coal-cutter pick comprising a hard metal tip having a shouldered enlargement at the end remote from the operative end, a tool steel nose having a bore fitting accurately the length of the tip up to the shoulder and a counterbore the end of which fits the shoulder accurately, the nose being longer than the tip and the counterbore being correspondingly longer than the enlargement, a tool steel body with a spigot filling the remainder of the counterbore, the nose being butt-welded to the tool steel body with pressure applied in the lengthwise direction of the tip for the shoulder of the tip to be held to the end of the counterbore by metallic pressure maintained on the end face of the shouldered end by the spigot when the weld has been completed.

10. A coal-cutter pick comprising a hard metal tip having a shouldered enlargement at the end remote from the operative end, a tool steel nose having a bore fitting accurately the length of the tip up to the shoulder and a counterbore the end of which fits the shoulder accurately, the nose being longer than the tip and the counterbore being correspondingly longer than the enlargement, a tool steel block partially filling the remainder of the counterbore, and a tool steel body with a spigot filling the rest of the remainder of the counterbore, the nose being butt-welded to the tool steel body with pressure applied in the lengthwise direction of the tip for the shoulder of the tip to be held to the end of the counterbore by metallic pressure maintained on the end face of the shouldered end by the tool steel block when the weld has been completed.

11. A coal-cutter pick as in claim 7, wherein the length of the tip up to the shoulder is a force fit in the bore of the nose.

12. A coal-cutter pick as in claim 7, wherein the length of the tip up to the shoulder is provided with slightly protruding splines affording a force fit in the bore of the nose.

13. A coal-cutter pick comprising a hard metal tip having an enlargement at the end remote from the operative end a bored tool steel nose, the enlargement being fitted into a counterbore of the bore of the nose and the length of the tip from the enlargement to the operative end fitting accurately in the bore of the nose, and a tool steel body butt-welded to the nose to enclose the enlargement of the tip in the counterbore and hold the tip by metallic pressure maintained on the enlargement when the weld has been completed.

14. A coal-cutter pick comprising a hard metal tip having an enlargement at the end remote from the operative end, a bored tool steel nose, the enlargement being fitted into a counterbore of the bore of the nose and the length of the tip from the shoulder to the operative end fitting accurately in the bore of the nose, a tool steel block fitting the counterbore accurately to enclose the enlargement of the tip in the counterbore, and a tool steel body butt-welded to the nose to hold the tip by metallic pressure maintained on the enlargement by the tool steel block when the weld has been completed.

15. A coal-cutter pick comprising a hard metal tip having an enlargement at the end remote from the operative end, a bored tool steel nose, the enlargement being fitted into a counterbore of the bore of the nose, splines, protruding slightly from the length of the tip from the shoulder to the operative end and making a force fit in the bore of the nose, a tool steel block fitting the counterbore accurately to enclose the enlargement of the tip in the counterbore, and a tool steel body butt-welded to the nose to maintain the metallic pressure on the enlargement of the tip through the tool steel block.

References Cited

UNITED STATES PATENTS

| | | | |
|---|---|---|---|
| 917,974 | 4/1909 | Terry | 299—93 X |
| 1,733,594 | 10/1929 | Greer et al. | 76—108 |
| 3,163,449 | 12/1964 | Westfall | 285—286 X |

FOREIGN PATENTS

| | | |
|---|---|---|
| 626,749 | 7/1949 | Great Britain. |

ERNEST R. PURSER, *Primary Examiner.*